Oct. 7, 1969   S. O. EMILSSON   3,471,027
TRUNNION VALVE FOR CONTINUOUS ROTARY FILTER
Filed May 3, 1968   4 Sheets-Sheet 1
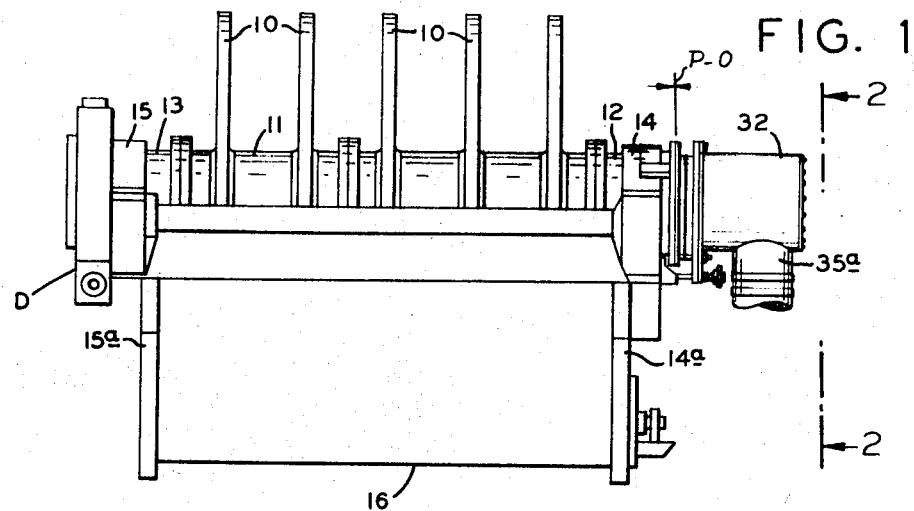
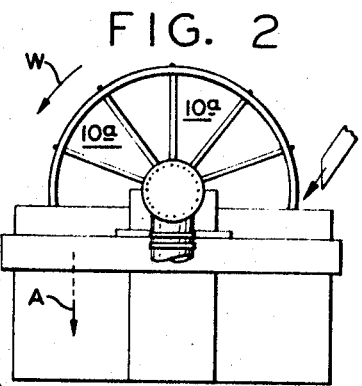
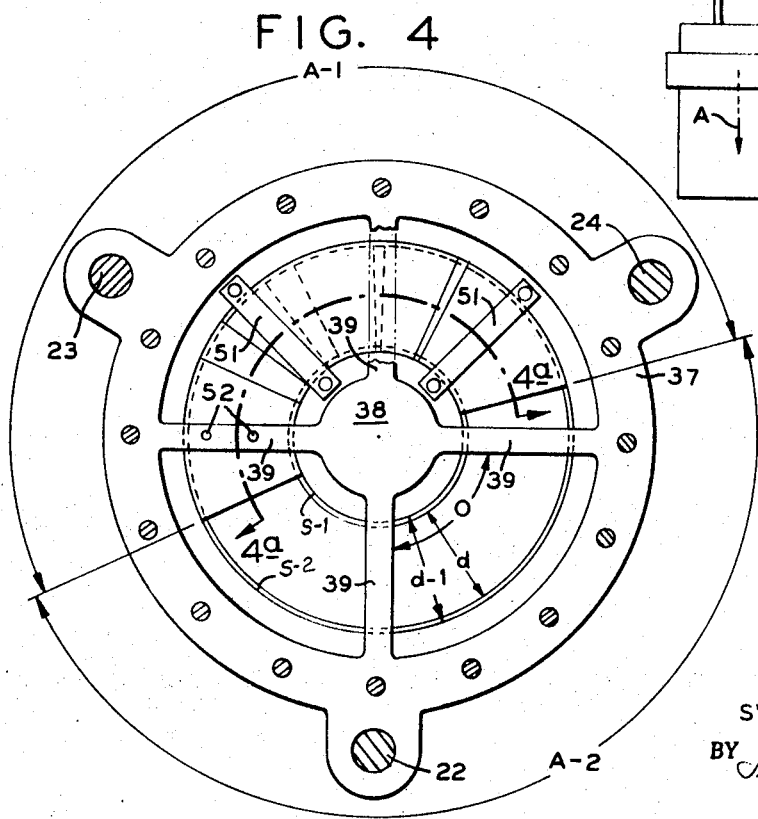
INVENTOR.
SVEN O. EMILSSON
BY Theodore M. Jablon
ATTORNEY.

Oct. 7, 1969   S. O. EMILSSON   3,471,027
TRUNNION VALVE FOR CONTINUOUS ROTARY FILTER
Filed May 3, 1968   4 Sheets-Sheet 2
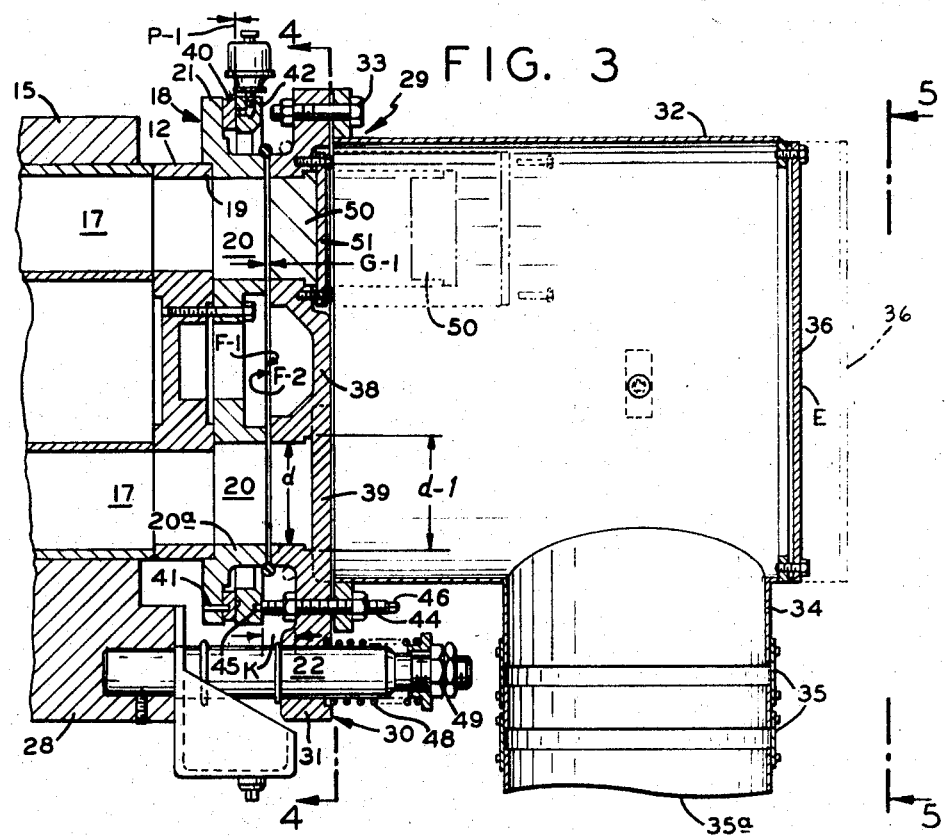
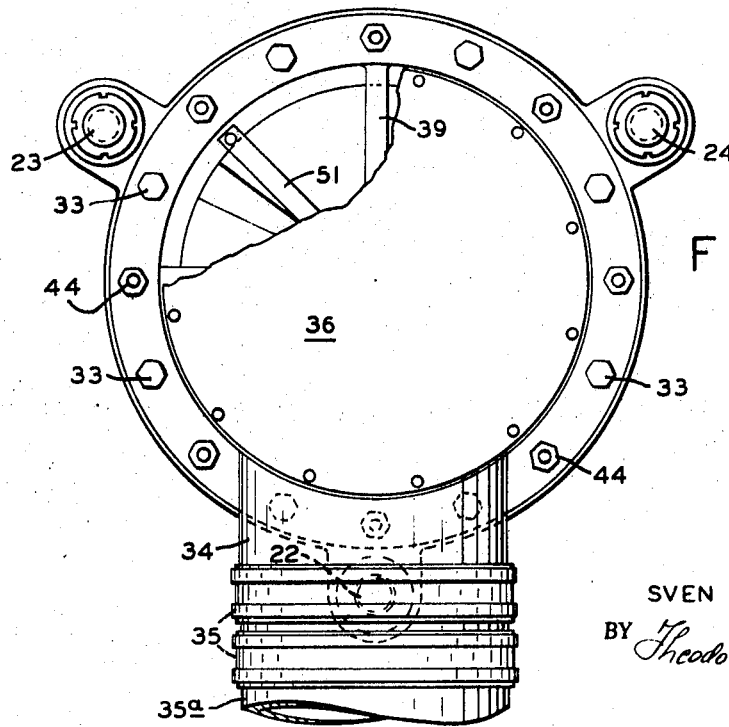
INVENTOR.
SVEN O. EMILSSON
BY Theodore M. Jablon
ATTORNEY.

Oct. 7, 1969 S. O. EMILSSON 3,471,027
TRUNNION VALVE FOR CONTINUOUS ROTARY FILTER
Filed May 3, 1968 4 Sheets-Sheet 3
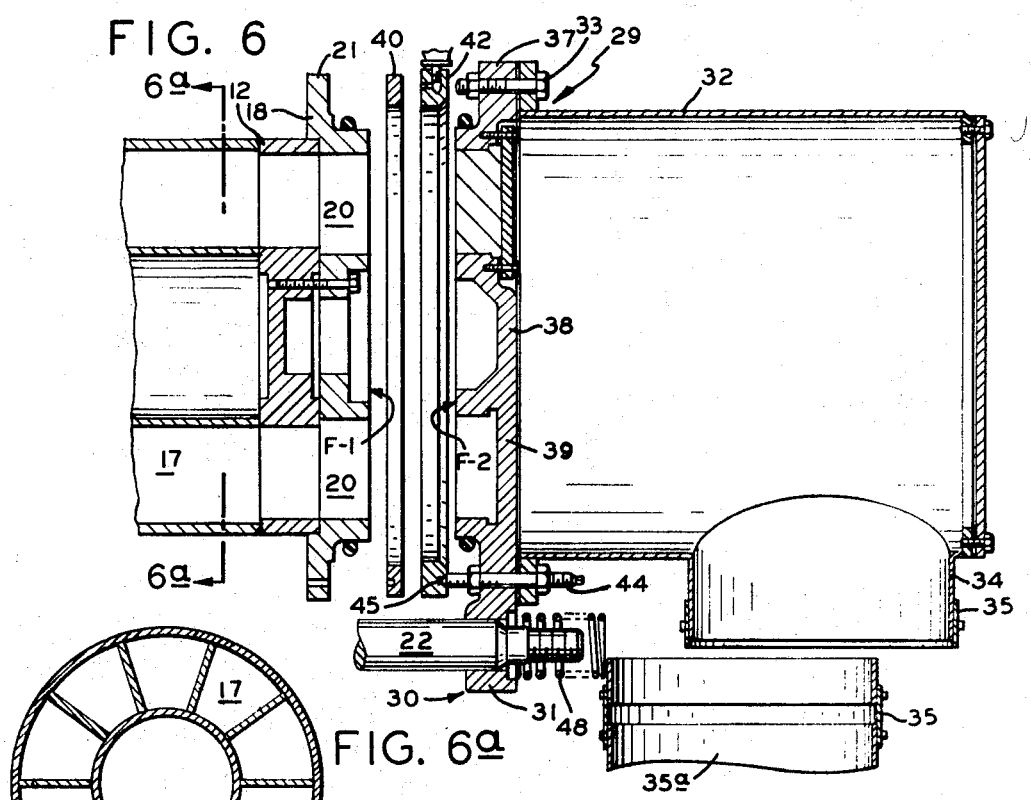
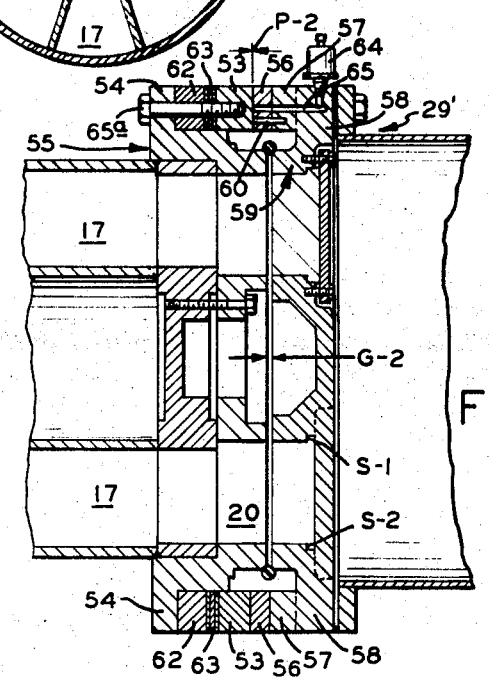
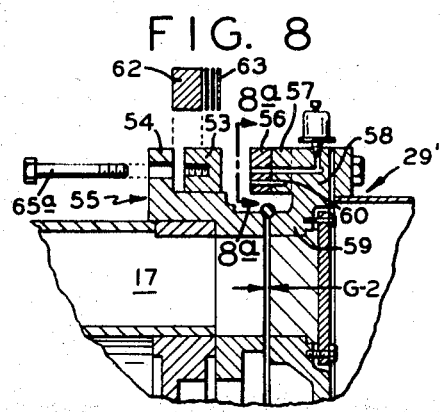
INVENTOR.
SVEN O. EMILSSON
BY Theodore N. Jablon
ATTORNEY.

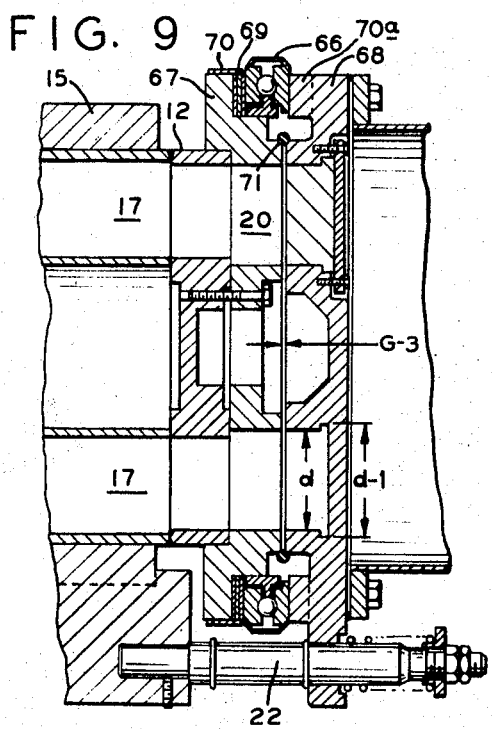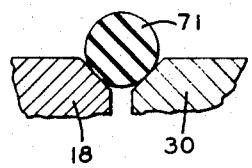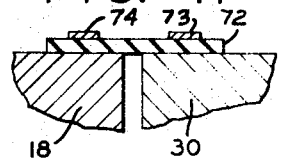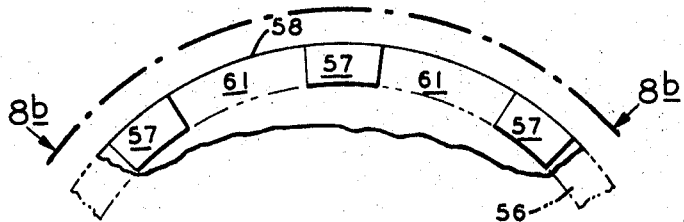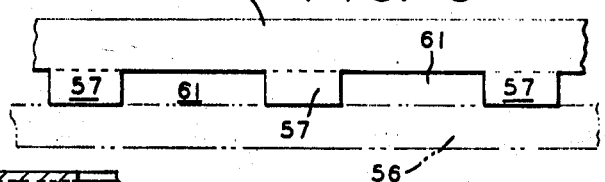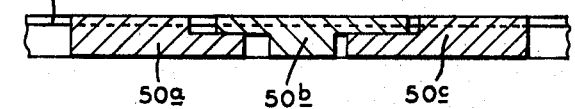

United States Patent Office 3,471,027
Patented Oct. 7, 1969

3,471,027
TRUNNION VALVE FOR CONTINUOUS ROTARY FILTER
Sven Olov Emilsson, Norwalk, Conn., assignor to Dorr-Oliver Incorporated, Stamford, Conn., a corporation of Delaware
Filed May 3, 1968, Ser. No. 726,348
Int. Cl. B01d 33/02
U.S. Cl. 210—331                    19 Claims

ABSTRACT OF THE DISCLOSURE

A trunnion valve construction for continuous filters having a horizontal axis of rotation, to be operated with positive valve clearance, featuring an annular thrust bearing surrounding the valve clearance gap concentric with the axis of rotation, and effective between the trunnion and the associate valve to maintain a valve clearance that is adjustable.

---

This invention relates to continuous rotary filters having an assembly of filter chambers mounted to rotate about a horiozntal axis on a pulp containing vat.

This class of filter may include, for example, disc type filters, drum filters having the filter media attached to the drum, as well as belt-type drum filters, all of which have a trunnion at the end of the rotating assembly. Within this assembly internal ducts spaced about the horizontal axis, extend from the vertical end face of the trunnion to the respective filter chambers or sections of the discs or drum.

More particularly, this invention relates to improvements in the so-called trunnion valve which is connected to the vacuum supply, and which contains the so-called bridges or arcuate bridge blocks that cooperate with the end face of the trunnion and thus with the internal ducts, to control the filtration cycle of the machine. The arcuate bridge blocks are adjustable in an annular groove of the stationary valve casing for vacuum chamber which is connected to the vacuum supply. Such adjustment may be required for example during start-up, or where changing conditions in the filter operation must be met.

In some circumstances, the stationary trunnion valve and the bridge blocks are allowed to operate in rubbing contact with the end face of the trunnion, subject to the pressure of the atmosphere acting upon the exterior of the valve. Such operating contact between the companion faces eliminates vacuum loss through leakage from the atmosphere, as well as internal vacuum loss due to leakage between filter sections, or between certain operating zones of the filtration cycle. This rubbing contact mode of operation is applicable or desirable, for example, where the vacuum supply is limited as by the length of a barometric leg as a source of vacuum supply. This mode of operation requires the application of a lubricant to the interface between the valve and trunnion, which may be objectionable where inter-mixing of the lubricant with the filtrate liquid is prohibited.

By contrast, this invention concerns a mode of valve operation requiring that positive clearance in the order of, say, 0.01″ to 0.03″ is to be maintained between the trunnion and the valve. Trunnion valve operation with positive clearance requires the provision of special devices in the form of thrust bearing means concentric with the filter axis and effective between the trunnion and the stationary valve to maintain the clearance against the pressure of the atmosphere acting upon the exterior of the valve. Maintaining this clearance avoids wear and tear between the faces of the trunnion and the valve, while eliminating the application to these faces of a filtrate-contaminating lubricant. Positive clearance operation is applicable preferably where vacuum loss incurred thereby is insignificant in relation to the amount of vacuum supply.

It is among the objects of this invention to provide an improved thrust bearing construction of great simplicity and compactness, wherein the bearing faces are readily accessible, inspectable, and replaceable, and wherein the valve clearance is closely and readily adjustable.

Another object is to provide simple, practical and compact means for adjusting the position of the bridge blocks, and thus the location of respective zones of the filtration cycle, while affording ready access to these blocks without necessitating the dismounting of the trunnion valve, in order that the blocks might be re-positioned or exchanged.

Still another object is to provide improved sealing means against vacuum leakage through the valve clearance from the atmosphere.

The foregoing objectives are attainable by the provision of an annular thrust bearing that surrounds the zone of the intended valve clearance, and is effective between flanged end portions of the trunnion and of the stationary valve respectively, and so constructed and arranged as to maintain a desired valve clearance against the external pressure of the atmosphere acting upon the valve. The annular valve clearance gap may be surrounded by an annular sealing means or sealing ring protecting the vacuum against the atmosphere, which sealing means in turn is surrounded by the annular thrust bearing device.

In one practical embodiment, the annular thrust bearing comprises a pair of cooperating thrust ring members surrounding the zone of intended valve clearance in concentrically spaced relationship therewith. At least one of the thrust ring members is positively adjustable or positionable in axial direction relative to its associated flange, whereby a desired valve clearance is attainable and maintainable.

According to another embodiment, an annular thrust ball bearing is interposed between the flanged end portions of the trunnion and of the valve respectively.

Heretofore, adjustable thrust bearing means had been provided within the vacuum box or casing of the valve, resulting in a construction complex of itself, and furthermore requiring a complex arrangement of stuffing boxes to seal the vacuum against the atmosphere. However, with the elimination of this internal or enclosed thrust bearing construction this invention provides ready access to the bridge blocks through the outer end wall of the present improved valve. In this way, and by a special mounting of the blocks they are rendered adjustable as well as exchangeable or replaceable without necessitating the dismounting of the valve.

In the improved trunnion valve of this invention, the annular thrust bearing is easily accessible for servicing and for adjustment of the valve clearance, the bridge blocks are easily accessible for inspection or adjustment without dismounting of the valve casing. In a preferred embodiment, the vacuum sealing means or ring around the clearance gap is easily accessible and replaceable.

Other features and advantages will hereinafter appear.

FIG. 1 is a side view of a disc type filter unit embodying the improved trunnion valve construction featuring a peripheral annular thrust bearing construction providing positive valve clearance gap.

FIG. 2 is an end view taken on line 2—2 of FIG. 1, showing the filter unit.

FIG. 3 is a greatly enlarged longitudinal sectional view of the trunnion valve of FIG. 1.

FIG. 4 is a transverse sectional view of the trunnion valve construction, taken on line 4—4 in FIG. 3, showing a combination of valve bridge blocks adjustably positioned with securing means therefor.

FIG. 4a is a detail sectional view taken on line 4a—4a in FIG. 4, showing the adjustable bridge blocks in mutually overlapping relationship.

FIG. 5 is an end view of the valve taken on line 5—5 in FIG. 3, with the end cover of the trunnion valve partially broken away.

FIG. 6 is an exploded view of the trunnion valve construction shown in FIG. 3.

FIG. 6a is a transverse sectional view taken on line 6a—6a in FIG. 6, showing longitudinal filtrate delivery ducts in the shaft.

FIG. 7 is a sectional view similar to FIG. 3, showing another embodiment of the trunnion valve construction.

FIG. 8, similar to FIG. 7, illustrates a manner of inspection of the annular thrust bearing.

FIG. 8a is a transverse part-sectional detail view taken on line 8a—8a in FIG. 8, showing the arrangement of spacer lugs in the stationary part of the trunnion valve construction.

FIG. 8b is a view taken on line 8b—8b of FIG. 8a.

FIG. 9 is a sectional view of the valve construction showing the annular thrust bearing in the form of a self-contained annular ball bearing unit.

FIG. 10 is a detail view showing greatly enlarged one form of a sealing ring for the valve clearance gap, as taken from FIG. 3.

FIG. 11 shows another form of a sealing means for the valve clearance gap.

The improved trunnion valve construction of this invention is herein shown as being applied to a rotary disc type filter unit illustrated in the semidiagrammatic FIGS. 1 and 2. Also by way of example, the bridge setting within the valve is shown to establish the operating zones of a filtration cycle suited for handling a fibrous pulp as in the filtration of "white water" from paper pulp, as will be furthermore described.

In this filter unit, a series of filter discs 10 are mounted upon a filter shaft 11, in horizontally spaced relationship to one another. The trunnion ends 12 and 13 of the shaft rotate in bearings 14 and 15 respectively mounted upon respective end walls 14a and 15a of a vat 16, so that the lower portion of the discs will be immersed in a body of pulp in the vat. Drive D rotates the shaft.

Each filter disc constitutes an assembly of sector-shaped filter chambers 10a (see FIG. 2) having filter media mounted thereon at both sides. Each sector of each filter disc registers horizontally with corresponding sectors of all the other discs, so that there are as many horizontal rows of sectors as there are sectors in each disc. Rotation of this assembly in bearings 14 and 15 in the direction of arrow W will cause the filter chambers of each disc to pass sequentially through the pulp. Filter cake collected from the pulp on both sides of the discs may be discharged at the descending side of the discs in a conventional manner whereby the cake material stripped from the discs drops through the usual vertical recesses (not shown) formed in the adjoining side wall of the vat, as indicated by arrow A.

Within the filter shaft there are provided horizontal ducts 17 (see FIGS. 6 and 6a) extending parallel to, and equally spaced around the axis of the shaft. Each of these ducts communicates with a respective row of filter sectors or filtrate chambers, and terminates in the transverse or vertical end face of the trunnion end 12 of the shaft.

A wear plate 18 has an annular recess or shoulder 19 fitted over the end of trunnion 12, and is formed with openings or flow passages 20 registering with respective ducts 17 in the shaft. This wear plate comprises a cylindrical portion 20a presenting the outer transverse end face F–1, and a flange portion 21.

Horizontal studs 22, 23, 24 are closely fitted into lugs 28 provided on the trunnion bearing 15. These studs support a stationary trunnion valve 29 in cooperative relationship with the wear plate 18 rotating with the trunnion.

Valve structure 29 comprises a so-called bridge plate 30 having a flange 31, and having an inner face F–2 parallel to face F–1 and cooperating therewith in controlling the filtration cycle, through a valve clearance gap G–1 that is a clearance to be maintained in the range of, say, 0.01 to 0.03 of an inch. According to the invention, this valve clearance is adjustably maintainable by means of an annular thrust bearing means effective between the flanges 21 and 31. This annular thrust bearing is concentric with the shaft axis, and may assume different forms such as herein illustrated and furthermore to be described. It should be understood, however, that this thrust bearing because of the vacuum maintained in the valve, is subject to the pressure of the outer atmosphere acting upon the outer end face E of the valve in axial direction towards the shaft. This thrust bearing is provided with adjusting means whereby a desired valve clearance G–1 is attainable and maintainable, as will be furthermore described in connection with the several embodiments herein shown.

The stationary valve structure 29 further comprises a cylindrical valve housing or valve box 32 having flange-and-bolt connection 33 with the bridge plate 30, and a downwardly extending neck 34 with a detachable flexible connection 35 connecting it with a source of vacuum or barometric leg 35a. This valve box has an end cover plate 36 which is removable so as to provide access to the interior of the box, and thus to the exposed side of the bridge plate for inspection and adjustment of the bridge blocks and thus of the filtration cycle, all as will be furthermore described.

The bridge plate 30 comprises (see FIG. 4) an outer rim portion 37, a center portion 38, and radial or spider arms or webs 39 rigidly interconnecting the center portion and the rim portion. The rim portion in turn comprises a cylindrical section 40 and the aforementioned flange 31 bolted to valve box 32, and supported on the horizontal studs 22, 23, 24 previously described.

In the embodiment of FIG. 3, the annular thrust bearing comprises a thrust bearing ring 40 seated on rotating flange 21 and positioned concentric with the axis as by means of locating pins 41, and a companion thrust bearing ring 42 mounted on stationary flange 31. A grease fitting 43 on bearing ring 42 provides lubrication to the interface between the two bearing rings. Bearing ring 42 is supported by a plurality of special set screws 44 alternating with bolt connections 33. These set screws may all be evenly adjusted so that ring 42 will be supported in a plane parallel to faces F–1 and F–2, and a distance $k$ from flange 31 such as to provide the desired valve clearance gap G–1. The ends 45 of set screws engage the ring 42 in the manner of locating pins, while the outer ends are formed with a square end 46 to fit a wrench. In addition, although not shown in FIG. 3, valve gap adjustment may be effected by shims interposed between ring member 40 and the associated flange 21. The vertical plane of contact between the cooperating thrust bearing rings 40 and 42 is designated as P–1. The corresponding plane in FIG. 1 is designated as P–0.

Valve 29 is held against outward axial displacement by means of coil springs 48 surrounding respective horizontal studs 22, 23, 24, and confined between flange 31 and lock nuts 49.

The spider like construction of bridge plate 30 is such as to accommodate therein bridge blocks 50 retained on annular shoulders S–1 and S–2 (see FIG. 7) for instance by means of radially extending clamping bars 51 (see FIGS. 3 and 4), or else by means of set screws 52 provided in one or more of the spider arms or webs 39.

In the present example (see FIGS. 4 and 4a) there are three bridge blocks 50a, 50b, and 50c having mutually overlapping and inter-engaging relationship with one another. In this arrangement these bridge blocks jointly extend over an area having the arcuate extent A–1, providing an open filtrate throughflow area of an arcuate extent A-2, defining the nature of a filtration cycle adapted for handling the initially mentioned fibrous suspension or "white water" from paper pulp.

FIG. 3 shows the cover plate removed in dotted line position, thus illustrating the manner in which the blocks may be readily adjusted to vary the arcuate dimensions A-1 and A-2 relative to one another, without dismounting the valve box 32 itself. In dotted lines this also illustrates how the bridge blocks can be removed from the bridge plate and inspected or replaced, all without requiring the valve head to be disconnected from the barometric leg. The bridge blocks are dimensioned so as to be removable (see FIG. 4) through arcuate openings O available between the spider arms or webs 39.

The exploded view of FIG. 6 illustrates a manner of manipulating the FIG. 3 construction for the purpose of either inspecting the bearing surfaces of the thrust bearing rings, or replacing the same. This requires removing the nuts on the supporting studs 22, 23, 24, and disconnecting the valve 29 from the barometric leg, then sliding the valve outwardly on the horizontal supporting studs.

According to the embodiment in FIG. 7, a modified arrangement of the annular thrust bearing requires that one thrust bearing ring 53 be bolted to a flange 54 of wear plate 55. The companion thrust ring member 56 is mounted and supported upon lugs 57 (see also FIG. 8a) integral with a flange 58 of bridge plate 59. The lugs are evenly spaced from one another upon the inwardly facing side of the ring, and have locating pins 60 for positioning the ring. The spaces 61 between the lugs (see FIGS. 8a and 8b) expose the clearance gap G-2 so that the same may be measured and established by a feeler gauge or the like. The vertical plane of contact between the thrust bearing rings 53 and 56 is designated as P-2 (see FIG. 7).

Spacer blocks 62 along with shims 63 are shown to be interposed between the thrust ring 53 and the associated flange 54, the shims serving to adjust the clearance gap G-2. A grease fitting 64 is mounted on the other flange 58, providing lubrication through bore 65 to the bearing contact faces of the rings.

The exploded view in FIG. 8 of the FIG. 7 construction illustrates a manner of inspecting the bearing faces of the cooperating thrust ring members, while leaving the stationary valve 29' in place. This is accomplished by loosening bolts 65a and removing at least the spacer blocks 62, in order that the thrust ring 53 may be slid back towards the associated flange and away from the companion flange 57. Then, if replacement or overhauling of the ring members should be found necessary, the valve 29' may be disconnected and retracted in the manner illustrated in FIG. 3. The required horizontal supporting studs 22, 23, 24 are here not shown.

In the embodiment of FIG. 9 the annular thrust bearing comprises a self-contained annular ball bearing unit 66 interposed between rotary wear plate flange 67 and stationary bridge plate flange 68. Shims 69 may be provided to establish a desired valve clearance gap G-3. The shims may be sector-shaped and surrounded, for instance by an Acme band retainer strap 70 or the like. Lugs 70a formed on flange 68 maintain the ball bearing unit 66 spaced from this flange.

The valve clearance gap in any of the above described embodiments may be sealed against the atmospheric outside pressure by means of a ring of elastically deformable material, as in the form that is an endless rubber ring or so-called O-ring 71 slightly stretched and snugly seated in the V-shaped groove formed by the cooperating bevelled edges of the wear plate and the bridge plate respectively (see also detail FIG. 10).

FIG. 11 shows a detail of another annular sealing means for the valve clearance gaps, in the form of a sealing band 72 held tightly around the bridge plate 30 as by the surrounding strap 73. Another strap 74 holds the band loosely around the wear plate 18.

It should be understood that each of the elements of the trunnion valve construction of this invention, or two or more together, may also find a useful application in other types of trunnion valve construction differing from the type described above.

While the invention has been illustrated and described as embodied in a trunnion valve construction including annular thrust bearing means adjustable to provide a valve clearance gap, it is not intended to be limited to the details shown, since various modifications and structural changes may be made without departing from the spirit of the present invention.

I claim:
1. In a continuous filter having an assembly of filter chambers rotating about a horizontal axis on a pulp containing vat,
   a trunnion valve construction for controlling the filtration cycle, which comprises a bearing block,
   a trunnion at the end of said assembly, rotatable in said bearing block, and having internal horizontal ducts equally spaced about the horizontal axis and leading from the end face of the trunnion to the respective filter chambers,
   a first flange provided on said trunnion,
   a stationary hollow valve member located directly opposite said trunnion and having an inner end face parallel and opposite to the end face of said trunnion, said valve member providing a trough flow area for vacuum supply to said ducts,
   a bridge plate structure for controlling the filtration cycle, interposed between said trunnion and said valve member, and detachably fastened to said inner end face of said valve member, and having bridge blocks adjustable therein,
   a second flange provided on the assembly of said bridge plate with said hollow valve member,
   a plurality of horizontal bolts extending from said bearing block, spaced along the periphery of said flanges, and constructed and arranged for supporting the assembly of said valve member and bridge plate in concentric relationship with said trunnion, and so as to be axially slideable thereon to and from said trunnion,
   and annular thrust bearing means concentric with the filter axis, interposed and confined between said first and second flanges, and so constructed and arranged as to provide a positive operating clearance gap between said bridge plate and said trunnion.

2. The trunnion valve construction according to claim 1, with the addition of annular sealing means surrounding and engaging the periphery of said clearance gap for sealing the same against the atmosphere.

3. The trunnion valve construction according to claim 1, wherein said trunnion and said bridge plate have mutually adjoining cylindrical portions provided with bevelled peripheral edges together forming a substantially V-shaped peripheral groove, with the addition of a sealing ring of elastic material engaging said groove so as to seal the same against the atmosphere.

4. The trunnion valve construction according to claim 1, wherein said annular thrust bearing means comprise a first annular bearing member detachably connected to said first flange, a second annular bearing member detachably connected to said second flange, and adapted for bearing contact with said first bearing member, and means for adjusting one of said bearing members in axial direction, for positively establishing and maintaining said clearance gap.

5. The trunnion valve construction according to claim 4, wherein said adjusting means for the annular thrust bearing means comprise a plurality of set screws threaded into said second flange, evenly spaced around said axis, for sustaining the thrust against said second annular bearing member, and whereby said second bearing member is spaced from said second flange sufficiently to expose the clearance gap.

6. The trunnion valve construction according to claim 4, wherein said adjusting means for the annular thrust bearing means comprise shim means interposed between said first flange and said annular thrust member, and means are provided for firmly connecting said first annular member to said flange.

7. The trunnion valve construction according to claim 4, wherein said adjusting means for the annular thrust bearing means comprise shim means interposed between said first flange and said annular thrust member, with the addition of positive spacer means interposed between said first flange and said first annular bearing member.

8. The trunnion valve construction according to claim 4, wherein means are provided upon one of said annular bearing members, operable for lubricating the interface between said annular bearing members.

9. The trunnion valve construction according to claim 4, wherein lugs are provided on said second flange, for supporting said second annular bearing member horizontally spaced from said second flange and in a plane transversal of the filter axis, and wherein shim means are interposed between said first annular bearing member and the associated flange, and bolts are provided firmly connecting said first annular member and shim means to said flange.

10. The trunnion valve construction according to claim 1, wherein said hollow valve member comprises a substantially cylindrical body portion having its outer open end provided with a detachable cover member, and having its inner end connected to said bridge plate said bridge plate having bridge blocks therein, whereby said bridge blocks are rendered accessible through said open end for adjustment.

11. The trunnion valve construction according to claim 10, wherein said bridge blocks are mounted for removal outwardly through said open end of the hollow valve member, and retainer means are provided for the blocks, accessible from within the valve member, constructed and arranged to allow for adjustment and removal of the blocks from within the valve member.

12. The trunnion valve construction according to claim 11, wherein said retainer means comprise clamping bars extending radially across said blocks.

13. The trunnion valve construction according to claim 1, wherein a wear plate is fixed to the end of the trunnion, said wear plate having a peripheral axially directed extension fitted over the end of said trunnion, with said first flange constituting part of said extension.

14. The trunnion valve construction according to claim 1, wherein a wear plate is fixed to the end of said trunnion, with said first flange constituting part of said plate, and wherein said second flange constitutes part of said bridge plate structure.

15. The trunnion valve construction according to claim 1, wherein said annular thrust bearing means comprise a self-contained annular ball bearing assembly interposed between said first and second flanges.

16. The trunnion valve construction according to claim 1, wherein said annular thrust bearing means comprise a self-contained annular ball bearing assembly interposed between said first and second flanges, and shim means interposed between said ball bearing assembly and one of said flanges.

17. The trunnion valve construction according to claim 16, with the addition of a retainer strap surrounding said shim means.

18. The trunnion valve construction according to claim 1, wherein said annular thrust bearing means comprise a self-container annular ball bearing assembly interposed between said first and second flanges, wherein lugs are provided on said second flange for supporting said annular ball bearing assembly horizontal spaced from said second flange and in a plane tranversal of the filter axis.

19. The trunnion valve construction according to claim 18, with the addition of shim means interposed between said annular ball bearing assembly and said first flange.

References Cited
UNITED STATES PATENTS 1,259,139   3/1918   Salisbury _____ 210—395 X REUBEN FRIEDMAN, Primary Examiner T. A. GRANGER, Assistant Examiner U.S. Cl. X.R.

210—395